UNITED STATES PATENT OFFICE.

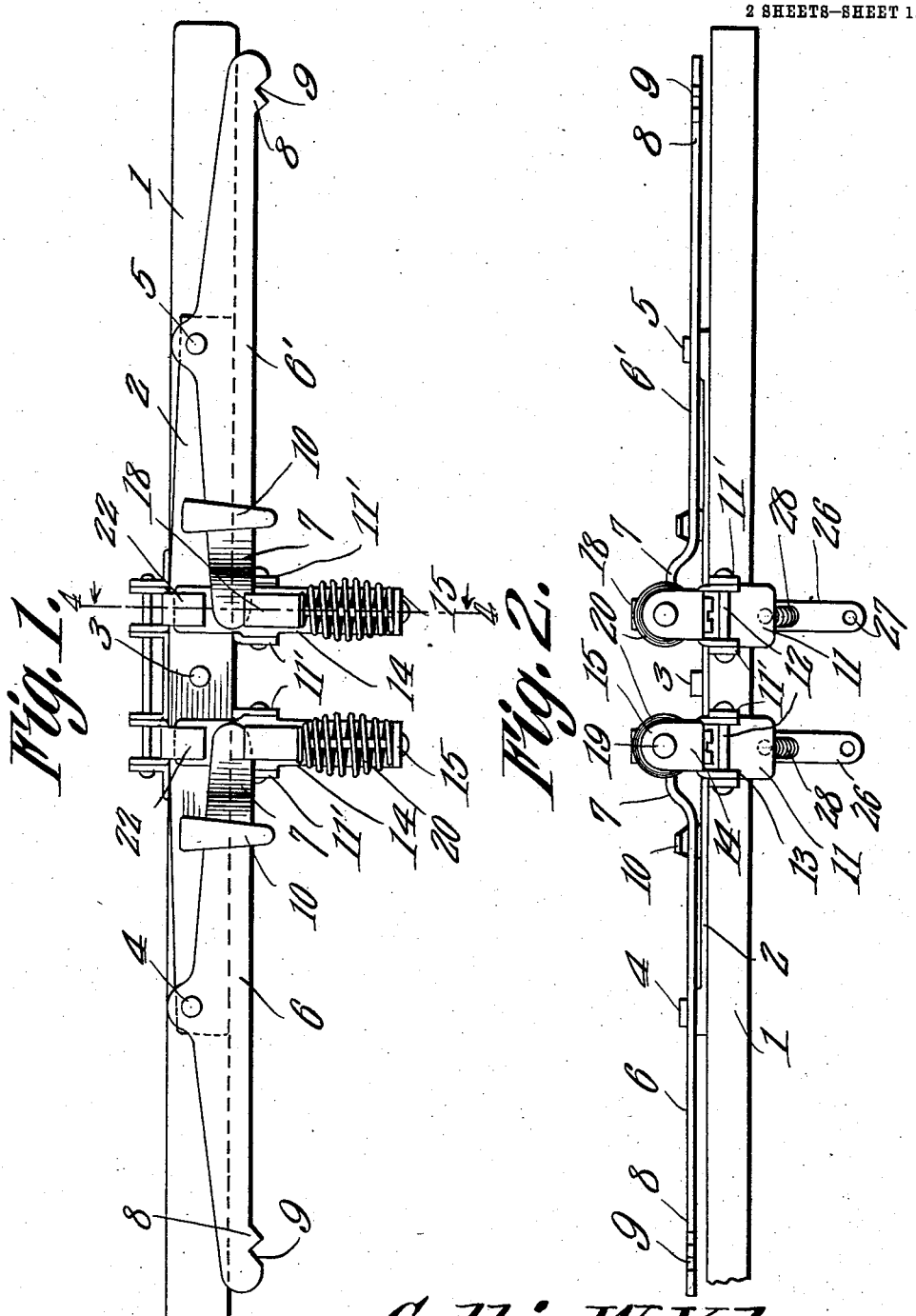

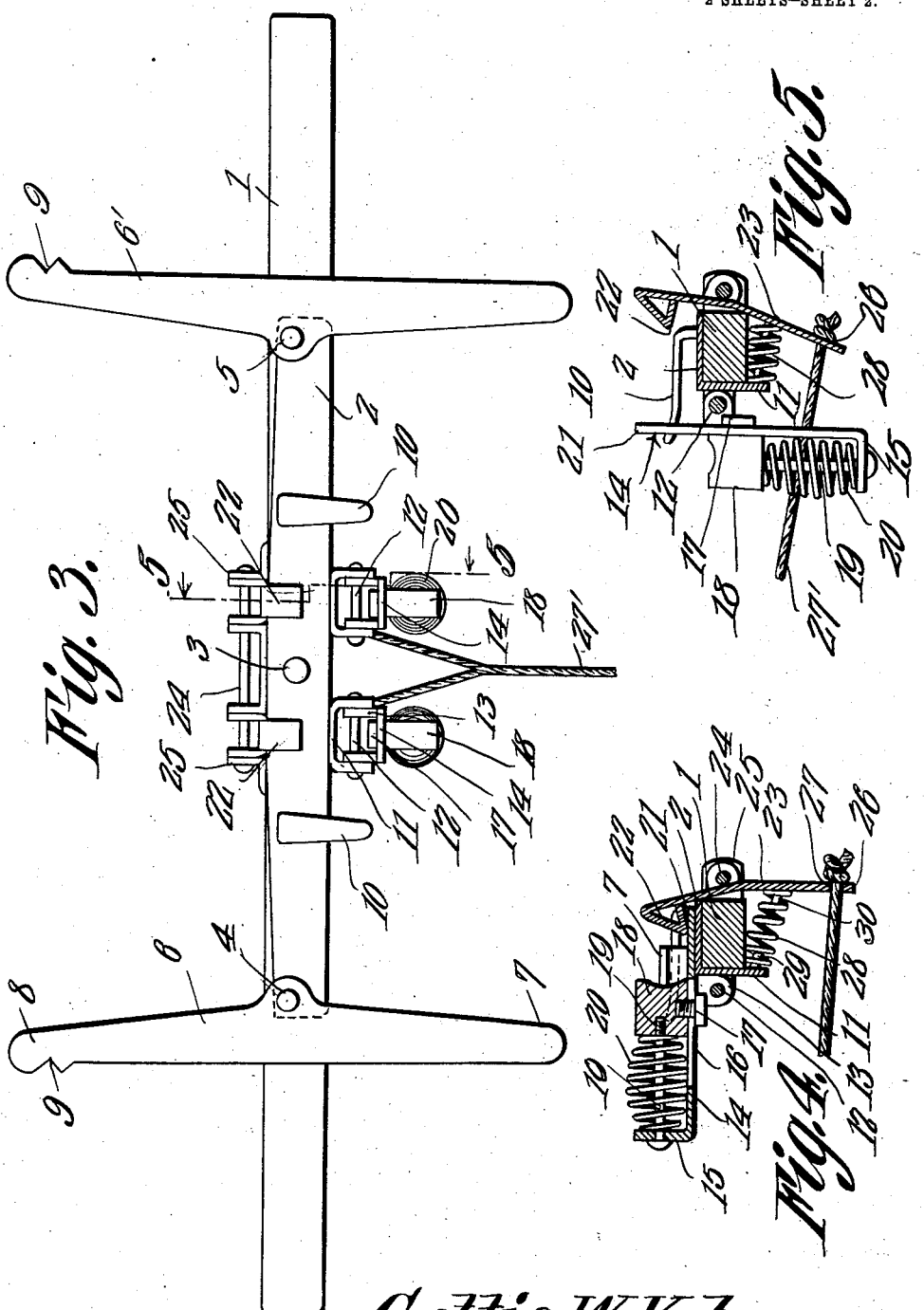

GETTIS WARD YATES, OF TAMPA, FLORIDA, ASSIGNOR OF ONE-HALF TO FRANK BADGER WILDER, OF TAMPA, FLORIDA.

SPRING-SWINGLETREE.

1,024,760. Specification of Letters Patent. Patented Apr. 30, 1912.

Application filed June 15, 1911. Serial No. 633,364.

*To all whom it may concern:*

Be it known that I, GETTIS W. YATES, a citizen of the United States, residing at Tampa, in the county of Hillsboro and State of Florida, have invented a new and useful Spring-Swingletree, of which the following is a specification.

The present invention relates to improvements in spring swingle trees, the primary object of the invention being the provision of two pivoted members so disposed that their outer ends are connected to the traces and their inner ends are spring cushioned individually and independently, said cushioning devices being pivoted to the cross or splint bar of a shaft and held in place by means of a catch, said catch being manually controlled from the vehicle for throwing the said spring cushioning devices so as to permit the movement of both of the sections of the swingle tree forwardly to release the animal in case of fright or accident, the said cushioning devices when in operable position, preventing the shock and the consequent injury or jar to the animal in pulling the vehicle.

A further object of this invention is the provision of a spring cushioned swingle tree, which comprises two separable trace engaging members pivoted intermediate their ends and having their inner ends toward each other and individually spring cushioned, the said cushioning devices being adjustable to regulate the tension of the spring, and provided with releasing devices, whereby the springs may be disengaged from the inner ends of the said sections of the swingle tree in case of accident, releasing the animal therefrom.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings:—Figure 1 is a top plan view of the complete swingle tree in operable position. Fig. 2 is a rear elevation thereof. Fig. 3 is a view similar to Fig. 1 with the parts in the position they assume when releasing an animal. Fig. 4 is a cross section on line 4—4 of Fig. 1. Fig. 5 is a similar view taken on line 5—5 of Fig. 3.

Referring to the drawings, the numeral 1 designates the cross bar or splint bar of the shaft, to which is mounted the plate 2 by means of the center bolt 3 and the terminal bolts 4 and 5, respectively.

Pivoted intermediate of their ends to the respective bolts 4 and 5, are the swingle tree members 6 and 6', respectively, each one of these sections being provided with the inner upturned end 7, and the trace engaging outer end 8, which is provided with the notches for receiving the trace as at 9.

To limit the forward and upward movement of the free end 7 of the respective swingle tree sections of members 6 and 6', the integral cleats or hooks 10 are carried by the plate 2, and depending and formed integral with the said plate 2 and projecting in the rear of the cross bar or splint bar 1, are the two lugs or plates 11, provided with the eyed lugs 11', for the reception of the rivets or bolts 12 for securing the eyed lugs 13 of the pivoted members or plates 14 thereto. These pivoted members or plates 14, are each constructed similarly, and consist of the rear right angled arm 15, the slotted central portion 16, and the trigger engaging forward end 21, the purpose of which will presently appear. Fitted slidably and adjustably within the slot 16 of the members 14, by means of the bolt or screw 17, is a block 18, which has connected thereto adjustably, the screw or bolt 19 so that the coiled or helical spring 20, may be mounted thereon between the right angled arm 15 and the inner face of the block 18, thus providing a cushioning means for the upturned end 7 of the respective swingle tree sections 6 and 6', the detailed construction of this being clearly shown in Figs. 4 and 5.

The terminals or ends 21 of the member 14 co-act with the catch 22 of the pivoted device 23, which is pivoted by means of the bolt 24 through the eyed lugs 25 carried and secured to the front face of the splint bar or cross bar 1, the lower end 26 of the catches being provided with openings 27 for the reception of a pull cord or chain 27' whereby the catches may be made to assume the position for locking as seen in Fig. 4, or be released for releasing the members 14 and the single sections 6 and 6', as clearly illustrated in Figs. 3 and 5, to permit the animal to be released from the shaft without endangering the life of the occupants of the vehicle, the catch members assuming the position when releasing the members 14 as clearly illustrated in Fig. 5 of the drawings. In order to hold the catch members in the locked position as indicated in Figs. 1, 2 and 4, the coiled spring 28 is employed and this engages the inner face of the plate 11 and the inner face of the terminal 23 of the catches, the studs 29 and 30 thereof, holding the same so that it will not fall from either locking or releasing position.

From the foregoing description taken in connection with the drawings, it is evident that when the device is in the position as shown in Fig. 1, that the animal in pulling upon the traces will cause the outer ends of the sections 6 and 6' to move so as to depress the springs 20 of the respective cushioning devices of said sections, and that thereby the weight or jar occasioned by sudden stops and irregularities in the road, will not in any way jar or affect the animal to a detrimental degree.

In case the animal becomes uncontrollable and it is desired to release the same without injury to the vehicle or occupants, the cord 27' is pulled upon, simultaneously actuating the catches 22 and thereby releasing the members 14. The pull upon the members 6 and 6', will cause the said members to drop and assume the positions as shown in Figs. 3 and 5, thereby permitting the sections 6 and 6' to assume the position as shown in Fig. 3, releasing the trace ends from the engaging ends 8 of the respective sections 6 and 6', and freeing the animal.

What is claimed is:—

1. The combination with the cross bar of a shaft, of a trace engaging and releasing device, comprising two sections pivoted intermediate of their ends to the cross bar, each section having a trace engaging outer end, two frames one to each section pivoted to the cross bar and disposed in the path of the inner free ends of the sections, a spring carried by each frame and normally in contact with its respective inner end of the sections, means for locking the frame in such engaging position, and means for releasing said locking means to permit the sections to swing to trace releasing position.

2. The combination with the cross bar of a shaft, of a trace engaging and releasing device, comprising a plate carried by the bar, two sections pivoted intermediate of their ends to said plate, and having trace engaging outer ends, two pivoted frames, one to each section, carried by the plates and disposed in the path of the inner free ends of the sections, a spring cushioned section retarding block normally in contact with its respective inner end of the section, means for locking the frame and block in section engaging position, and means for releasing said locking means to permit the sections to swing to trace releasing position.

3. The combination with a cross bar of a shaft, of a trace engaging and releasing device, comprising a plate carried by the bar, two sections pivoted intermediate of their ends to said plate and having trace engaging outer ends, two pivoted frames, one to each section carried by the plate and disposed in the path of the inner free ends of the sections, a spring cushioned section retarding block normally in contact with its respective inner end of the section, and a spring actuated catch pivoted to the bar and opposed to hold its respective frame.

4. The combination with a cross bar of a shaft, of a trace engaging and releasing device, comprising two sections pivoted intermediate their ends to said bar and having trace engaging outer ends, two pivoted frames, one to each section carried by the bar and disposed in the path of the inner free ends of the sections, a spring cushioned section retarding block normally in contact with its respective inner end of the section, one carried by each of said pivoted frames, a catch for locking said pivoted frames in section engaging position, and means to release said catches to permit said sections to release the traces.

5. The combination with a cross bar of a shaft, of a trace engaging and releasing device, comprising two sections pivoted intermediate of their ends to said bar and having trace engaging outer ends, two pivoted frames connected to the bar, one to each section, a spring cushioned block carried by each pivoted frame and in the path of the inner free end of each section, and spring actuated catches, one to each frame, pivoted to the bar and adapted to hold said frames in section engaging position.

6. The combination with a cross bar of a shaft, of a trace engaging and releasing device, comprising two sections pivoted intermediate their ends to said bar and having trace engaging outer ends, a hook carried by the bar and disposed in front of the inner free end of each section and adapted to restrain the forward and upward movement thereof, a pivoted frame connected to the bar and opposed to the opposite side of the inner free end of each section, a spring actuated block carried by each frame and normally in contact with the inner free end of each section, and a manually released spring catch for each pivoted frame connected to the bar for locking the pivoted frames in section retarding position.

7. The combination with the cross bar of a shaft, of a trace engaging and releasing device, comprising two trace holding sections pivoted intermediate their ends, the inner ends of said section being toward the center of the bar and upturned, a hook carried by the bar and opposed to the upturned end of each section, for limiting the forward movement of said inner free ends of the bars, a pivoted frame connected to the bar and disposed to the rear of the inner free ends of the sections, a slidably mounted spring cushioned block carried by each pivoted frame and normally in engagement with the rear portions of the inner free ends of the sections, and a spring actuated catch for each pivoted frame for locking the frames in section engaging position.

In testimony that I claim the foregoing as my own, I have hereto affixed my signature in the presence of two witnesses.

GETTIS WARD YATES.

Witnesses:
K. M. JONES,
B. L. PALMER.

Copies of this patent may be obtained for five cents each, by addressing the "Commissioner of Patents, Washington, D. C."